(12) United States Patent
Brüser et al.

(10) Patent No.: US 11,724,215 B2
(45) Date of Patent: Aug. 15, 2023

(54) DEVICE AND METHOD FOR CHEMO-PHYSICAL MODIFICATION OF PARTICLES OF A SUSPENSION

(71) Applicants: Leibniz-Institut für Plasmaforschung und Technologie e.V., Greifswald (DE); PRE Power, Recycling, Energyservice GmbH, Penzlin (DE)

(72) Inventors: Volker Brüser, Greifswald (DE); Stephan Reuter, Montréal (CA); Norbert Rossow, Penzlin (DE)

(73) Assignees: LEIBNIZ-INSTITUT FÜR PLASMAFORSCHUNG UND TECHNOLOGIE E.V., Greifswald (DE); PRE POWER, RECYCLING, ENERGYSERVICE GMBH, Penzlin (DE)

( * ) Notice: Subject to any disclaimer, the term of this patent is extended or adjusted under 35 U.S.C. 154(b) by 0 days.

(21) Appl. No.: 17/102,486

(22) Filed: Nov. 24, 2020

(65) Prior Publication Data

US 2022/0152531 A1 May 19, 2022

(30) Foreign Application Priority Data

Nov. 17, 2020 (CA) .................................. CA 3099488

(51) Int. Cl.
*B01D 21/00* (2006.01)
*B01D 21/28* (2006.01)
*B01J 19/10* (2006.01)

(52) U.S. Cl.
CPC ......... *B01D 21/283* (2013.01); *B01D 21/003* (2013.01); *B01J 19/10* (2013.01)

(58) Field of Classification Search
CPC ....... F02M 27/04; C12M 45/02; C12N 13/00; B02C 19/18; B01D 21/28; B01D 21/00; B01J 19/10
See application file for complete search history.

(56) References Cited

U.S. PATENT DOCUMENTS

| 2006/0049116 A1* | 3/2006 | Subramanian ......... F02M 27/04 |
| | | 210/748.01 |
| 2014/0206060 A1* | 7/2014 | Halaka ................... C12M 45/02 |
| | | 435/173.7 |
| 2016/0346758 A1 | 12/2016 | Kress et al. | |

FOREIGN PATENT DOCUMENTS

| GB | 2540545 | 1/2017 | |
| WO | 96/25232 | 8/1996 | |
| WO | WO-2020205635 A1 * | 10/2020 | ................ C02F 1/34 |

* cited by examiner

*Primary Examiner* — Walter D. Griffin
*Assistant Examiner* — Cameron J Allen
(74) *Attorney, Agent, or Firm* — JMB Davis Ben-David

(57) ABSTRACT

The invention relates to a device (1) for disintegrating particles (3) of a suspension with ultrasonic sound, the device (1) comprising:
  a channel (10) for a suspension, wherein the channel (10) comprises a particle-processing portion (12),
  at least one pump (20) configured and arranged to adjust a flow velocity of the suspension in the channel (10),
  at least one ultrasonic sound source (30), arranged such at the channel (10) that an ultrasonic field generated by the ultrasonic sound source (30) extends at least in the particle-processing portion (12) inside the channel (10),
  wherein the device (1) comprises an instrumentation and control system configured to regulate the flow velocity of the suspension such that particles (3) of the suspension are arrangeable in a predefined spatial particle distribution in the particle-processing portion (12) of (Continued)

the channel (10) by adjusting the flow velocity of the suspension with respect to an inertial force (40) acting on the suspension, wherein the inertial force (40) is gravity (42) or a centrifugal force (44), characterized in that the device (1) comprises a plasma source (80), wherein the plasma source (80) is arranged such that a plasma generated by the plasma source (80) extends into the particle-processing portion (12) or upstream of the particle-processing portion (12).

14 Claims, 10 Drawing Sheets

DEVICE AND METHOD FOR CHEMO-PHYSICAL MODIFICATION OF PARTICLES OF A SUSPENSION

FIELD

The invention relates to a device for disintegrating organic or inorganic particles of a suspension with ultrasonic sound and a method for disintegrating such particles.

BACKGROUND

Ultrasonic sound treatment of suspensions for comminuting particles is known in the state of the art.

U.S. Pat. No. 4,156,593 A discloses a device for comminuting a slurry of coal particles with an ultrasonic sound source. The ultrasonic sound sources are arranged such that there are no inactive regions of vibratory energy through which the slurry can flow.

While this goal is desirable for many applications, there still remain many parameters to be optimized depending on the composition of the slurry or the kind of particles to be treated etc.

DE 1020 0900 2278 A1 discloses a combination device that generates a plasma in a gas-filled particle-processing volume and/or exposes the liquid-filled particle processing volume to ultrasonic sound.

US 2014/0206060 A1 teaches an apparatus for sonication of a plurality of samples by means of a flow-through geometry that allows for comminuting of particulates and organisms in a fluid. For this purpose, the apparatus comprises a flow channel as well as a flow pump for pumping the fluid through the flow channel. At the flow channel the apparatus has ultra-sound sources for providing mechanical energy to the fluid in the flow channel used for comminuting the particulates in the fluid.

Similar devices are known from US 2016/0346758 A1, GB 2 540 545 A, and WO 96/25232 A1.

However, the degree of comminuting the particles to smaller particles is not readily controllable by these devices.

Suspensions might be treated to e.g. achieve at least one of the following objectives:
  homogenization the size of the particles in the suspension,
  selective sedimentation and/or separation of particles depending on at least one of their properties as e.g. size, density or material composition, or
  generation a specific state of the slurry such as a suspension or a dispersion.

Depending on the particular objective, a particular optimal energy input in a particle is necessary. Such energy input is for example dependent on the duration the particle is exposed to ultrasonic sound.

In the devices reported in the state of the art, the control of the suspension flow in the particle-processing portion remains unaddressed. In particular it remains unaddressed how to regulate the suspension flow in the particle-processing portion such that an optimal energy input in a particle can be obtained.

SUMMARY

Therefore, an object of the present invention is to provide a device for comminuting particles of a suspension wherein the duration a particle is exposed to ultrasonic sound can be adjusted such that the control regarding the energy input in particles of the suspension is increased.

The objective is achieved by a device having the features of claim 1 and a method with the features of claim 11.

Advantageous embodiments are described in the sub-claims.

BRIEF DESCRIPTION OF THE FIGURES

It is shown in
  FIG. 1 a schematic cross-section of a device comprising a straight section and a pulsed plasma source.

DETAILED DESCRIPTION

Figure 1:
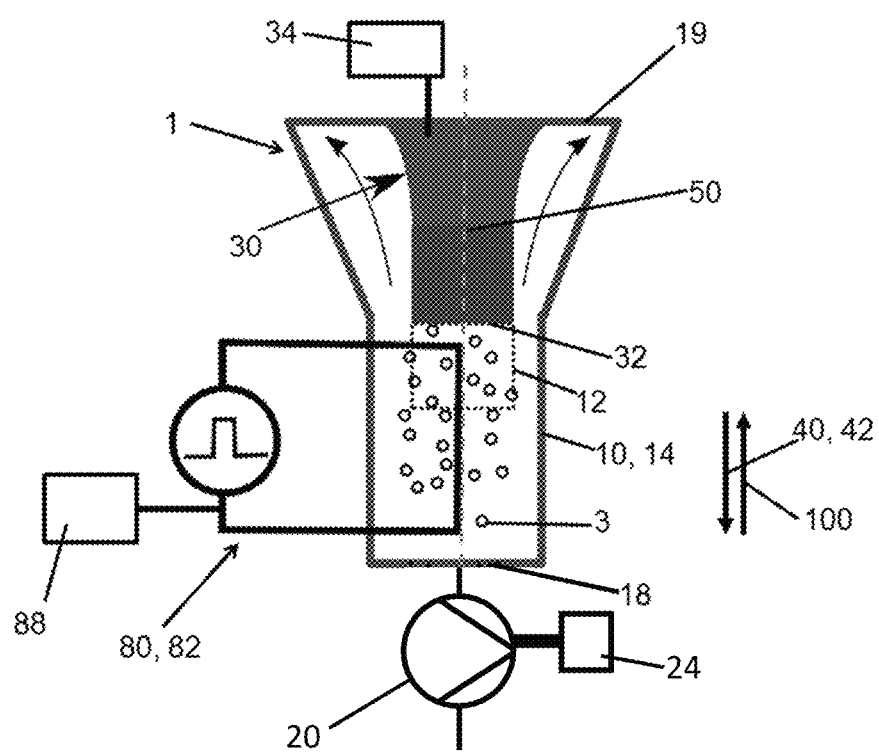

A first aspect of the invention is related to a device for disintegrating particles of a suspension with ultrasonic sound. The device comprises:
  a channel for a suspension, wherein the channel comprises a particle processing portion,
  at least one pump configured and arranged to adjust a flow velocity of the suspension in the channel, and
  at least one ultrasonic sound source, arranged such at the channel that an ultrasonic field generated by the ultrasonic sound source extends at least in the particle-processing portion inside the channel.

The device comprises an instrumentation and control system configured to regulate the flow velocity of the suspension such that particles of the suspension are arrangeable in a predefined spatial particle distribution in the particle-processing portion of the channel by adjusting the flow velocity of the suspension with respect to an inertial force acting on the suspension. The inertial force is gravity or a centrifugal force.

According to the invention, the device further comprises a plasma source, wherein the plasma source is arranged such that a plasma generated by the plasma source extends into the particle-processing portion or upstream of the particle-processing portion.

A plasma is the fourth state of matter containing free electrons, radicals, ions, excited and neutral species. In particular, the plasma can be a cold plasma, also referred to as non-thermal plasma.

According to another embodiment of the invention, the plasma source is configured to provide and/or produce a thermal plasma, i.e. a hot plasma.

According to another embodiment of the invention, the plasma source comprises plasma torch for providing the plasma.

According to another embodiment of the invention, the plasma source is configured to produce an electric arc discharge reaching into particle-processing portion.

By means of the generated plasma the suspension can be treated. The radicals can particularly lead to a chemical erosion of the particles. The term "chemical erosion" particularly refers to the interaction between reactive species e.g. OH-radicals and particle surface. In the case of organic material the interaction of OH-radicals with hydrocarbon chains generates hydrocarbon fragments that might diffuse from the corresponding surfaces, leading to the disintegration of the respective particles.

It is also conceivable that the plasma sterilizes the suspension or leads to other chemical modifications of the suspension, in particular of the particles. The treatment with plasma can lead to an acidification of the suspension. This advantageously facilitates the hydrolysis and subsequent disintegration of biological particles of the suspension.

In the context of the present specification, the terms "comminute" and "disintegrate" refer to the same process, namely to break apart particles into small parts or pieces.

A suspension can be a heterogeneous mixture that comprises a liquid and particles. The suspension can comprise organic and/or inorganic particles. Individual particles may differ in at least one property such as material composition, size, shape and density. They can differ with respect to their drag. In particular, the particles can be solid. However, soft particles are also conceivable.

The channel is configured to receive and to guide or transport a suspension. The channel can be divided along the flow direction into several sub-channels and/or can comprise at least one compartment.

The channel can be a pipe or a tube and can comprise or be formed out of stainless steel, an alloy of metal or plastics. Particularly, the cross-sectional area of the channel has a circular shape. The diameter of the channel can remain constant along the extension direction of the channel. In another embodiment, the diameter of the channel changes along the extension direction of the channel. It is conceivable that the channel is tapered towards an entrance and/or an exit of the channel. Therein, the entrance refers to an entry opening for the suspension that lies upstream of the exit and the exit is an opening through which the suspension can leave the channel. In an embodiment the channel tapers or widens several times along its extension direction.

The modifications of the diameter of the channel are particularly useful for controlling the pressure of the suspension, the flow velocity of the suspension and other parameters related to the hydrodynamic equations describing a flow in the channel.

The at least one pump is configured and arranged to adjust the flow velocity. The term flow velocity is understood as a vector entity comprising a direction and a magnitude. The respective direction is referred to as flow direction.

In particular, the at least one pump can comprise a speed control to adjust the flow velocity, in particular its magnitude. In an embodiment, the at least one pump is configured to be reversible regarding the pump direction such that the orientation of the flow direction can be changed by means of the at least one pump. In particular, the at least one pump might enable both a flow in forward direction and a flow in backward direction. The flow of the suspension in forward direction means that the flow direction is oriented towards the exit auf the channel. The flow of the suspension in backward direction means that the flow direction is oriented in direction of the entrance of the channel.

When the ultrasonic sound source is operating, an ultrasonic sound field is generated which extends inside the channel. The section of the channel in which the energy of the ultrasonic sound waves is particularly high enough to disintegrate particles of the suspension is referred to as the particle-processing portion. The required energy depends on the composition and kind of particles to be comminuted as well as the particular objective of the treatment. The required energies are well-known to a person skilled in the art.

The particle-processing portion can extend over the entire cross-sectional area of the channel. This ascertains that all particles passing that section of the channel are exposed to ultrasonic sound. In another embodiment, the particle-processing portion extends only in a part of the cross-sectional area. This can be an area extending symmetrically around a central axis of the channel. Alternatively it is conceivable that the particle-processing portion extends close to a channel wall. In an embodiment in that the particle-processing portion extends only in a part of the cross-sectional area of the channel a portion of the suspension can bypass the particle-processing portion such that this portion is not treated by ultrasonic sound of the respective ultrasonic sound source.

The ultrasonic sound source can comprise an end face that is particularly arranged inside the channel. The ultrasonic sound source can particularly be a sonotrode.

In an embodiment, the ultrasonic sound source comprises a generator and a measuring and control device. In particular, the ultrasonic sound source is configured to generate ultrasonic sound with a frequency between 18 kHz and 32 kHz, in particular between 20 kHz and 30 kHz. Particularly, an ultrasonic sound source with an engine power between 100 W and 4 kW can be used. In particular, the ultrasonic sound intensity is adjustable such that in consequence the energy input in the particles of the suspension is adjustable. Ultrasonic sound intensity describes the sound power that passes through a unit area perpendicular to that area.

The propagation of ultrasonic sound waves can be described by vectors; a propagation component in the context of the description refers to a vector-based description of sound wave propagation. In particular, the ultrasonic sound source is arranged such that ultrasonic sound emitted by the ultrasonic sound source propagates with at least one vector component against at least one vector component of the flow direction of the suspension within the particle-processing portion.

In one embodiment, the direction of the propagation of ultrasonic sound waves can be adjusted, in particular by adjusting the position and/or arrangement of the ultrasonic sound source.

Ultrasonic sound waves can generate cavitation. Cavitation involves the formation, growth, pulsation, and collapse of bubbles, also known as cavitation bubbles, in liquids. If the bubbles collapse, they can cause high pressure that can act as a disruptive force on adjacent particles leading to the disintegration of these adjacent particles. In particular, shear forces are generated if the cavitation bubbles collapse.

Furthermore, ultrasonic sound waves might disrupt molecular bonds which can lead to the generation of radicals or can ionize water.

Via the suspension flow, particles can be transported from the entrance to the exit of the channel, passing the particle-processing portion. Amongst other things, the velocity with that a particle is transported within the suspension depends on specific properties of the particle, e.g. material composition, shape, size or density. In addition, an inertial force acts on the particles. The inertial force can be gravity or a centrifugal force. The device is configured such that the inertial force is oriented with at least one vector component against or perpendicular to the flow direction of the suspension, respectively. By adjusting the flow velocity with respect to the respective inertial force, it is possible to sort, i.e. separate or arrange, the particles in predefined spatial particle distributions that are also referred to as subpopulation in the following.

The at least one pump is configured to provide a flow velocity that is adjusted such that a predefined subpopulation of particles can remain for a longer time in the particle-processing portion than other subpopulations of particles. In other words this means that a retention time of the predefined subpopulation of particles in the particle-processing portion is prolonged compared to the retention time of other subpopulations. In the particle-processing portion the particles can be exposed to ultrasonic sound and to cavitation bubbles. The particles can be comminuted and the processed particles can be carried away from the particle-processing portion with the flow.

Due to the interplay of the flow velocity and the inertial force, particles can be exposed for a longer time to ultrasonic sound, allowing for a more efficient disintegration of particles compared to disintegration using devices reported in the state of the art.

The device can be operated to keep an adjustable balance between the drag of the suspension flow and a sedimentation velocity such that particles of interest can be comminuted. The sedimentation velocity describes how fast a particle sinks in the fluid of the suspension. It depends on the viscosity and density of the fluid, on properties of the particles, but also on the magnitude and direction of the inertial force acting on the suspension. The particle size distribution after the treatment of the particles with the ultrasonic sound can be narrowed such that an initially heterogeneous size distribution becomes more and more homogenous.

The device according to the invention is not limited to disintegrate particles in a suspension but can also be used to treat fluids in a specific and selective way.

In an embodiment of the invention in that the device is configured to process the particles by means of gravity as the inertial force, the channel comprises a straight section that comprises the particle-processing portion, wherein the channel is oriented such that the flow velocity of the suspension is oriented against gravity.

That the device is configured to process the particles by means of gravity means that the particles of the suspension are arrangeable in a predefined spatial particle distribution in the particle-processing portion by adjusting the flow velocity of the suspension.

The channel, in particular the particle processing portion, is oriented such that the flow velocity of the suspension is oriented against gravity.

A central axis extends along the direction of gravity. In this embodiment, the central axis extends along the extension direction of the channel.

The term "straight section" particularly refers to a section of the channel that extends in parallel to the central axis. In other words this means that in the straight section there is no curvature of the channel along its extension direction.

This embodiment facilitates a particularly simple comminution by orienting the suspension flow against gravity. The flow velocity is oriented against gravity essentially with one vector component or completely against gravity.

In particular, the flow velocity of the suspension is the flow velocity of the fluid, while the particle flow velocity depends also on properties of the individual particles, for instance the particle sizes.

The flow velocity can be adjusted by means of the at least one pump in order to keep particles with predefined characteristics as e.g. densities for a prolonged time in the particle-processing portion.

In particular, the particle-processing portion can extend over the entire cross-sectional area of the channel. In another embodiment the dimensions of the channel and the ultrasonic sound source are selected such that the particle-processing portion extends only in a part of the cross-sectional area of the channel.

One embodiment of the invention is characterized in that if the device is configured to process the particles by means of a centrifugal force as the inertial force, the channel comprises a curved section that is curved around a central axis wherein the central axis extends along the direction of gravity. Further, the curved section comprises the particle-processing portion.

That the device is configured to process the particles by means of a centrifugal force as the inertial force means that the particles of the suspension are arrangeable in a predefined spatial particle distribution in the particle-processing portion by adjusting the flow velocity of the suspension with respect to a centrifugal force.

The curved section that is curved around a central axis can extend circularly or spirally or helically.

In an embodiment, the particle-processing portion extends over the entire cross-sectional area of the channel. In another embodiment, the ultrasonic sound source is configured and arranged such that the particle-processing portion extends only in a part of the cross-sectional area of the channel such that a portion of the suspension can bypass the particle-processing portion without treatment.

In an alternative embodiment, the device can comprise multiple curved sections wherein each individual curved section can extend differently. In other words this means that the extension of the various curved sections can differ from one another.

By flowing the suspension along a curved section, a centrifugal force can act on the suspension. Amongst others, the particular size of the centrifugal force depends on the geometry of the device, e.g. a radius of the device which is the distance from the central axis to the curved channel. Therefore, the inertial force that acts on the particles of the suspension can be modified using a device with a predefined geometry. It is possible to expose the suspension to greater or smaller inertial forces than earth gravity. By the geometry of the device the inertial force can be adjusted. Additionally, it can be adjusted via the flow velocity of the suspension, in particular by means of the pump.

According to the invention, the ultrasonic sound source is arranged in the channel such that the channel encloses the ultrasonic sound source, enabling the suspension to pass the ultrasonic sound source.

This easily enables the passage of the suspension through the channel.

In an embodiment the ultrasonic sound source is arranged on a central axis allowing the suspension to flow symmetrically past the ultrasonic sound source.

In another embodiment the ultrasonic sound source is arranged such that the ultrasonic field extends along the extension direction of the channel. This embodiment allows for an optimized energy disposition in the suspension.

An embodiment according to the invention comprises that the ultrasonic sound source is arranged such that the ultrasonic field generated by the ultrasonic sound source extends in a part of the cross-sectional area of the channel.

In another embodiment, the device is characterized in that the device comprises a settling portion, where settled particles of the suspension are received.

A settling portion can be arranged and configured such that particles with predefined properties settle in a specific settling portion. These settled particles can easily be eliminated from the suspension since these particles do not flow with the suspension anymore. The settled particles can be discarded, collected and/or further processed.

Particularly, a settling portion can comprise a distribution channel or a channel in chamber shape that might reduce the flow velocity facilitating the settling of particles with predefined properties.

The settling portion is configured such that an easy access from the outside is enabled.

This can include that the settling portion is configured to be reversibly removable from the device.

In an embodiment, the device can comprise at least one sluiceway. The at least one sluiceway can be arranged and configured such that particles, in particular settled particles, can be removed from the device through the at least one sluiceway.

According to another embodiment of the invention, the device comprises a recirculation means, such as a suitable channel system that is configured to circulate the suspension flow past the particle-processing portion back to an entrance of the channel, such that the suspension can be exposed to the particle-processing portion again.

The recirculation means is configured to guide the suspension from the exit back to an entrance of the channel such that the suspension can flow through the channel again. By means of a device comprising one particle-processing portion and a recirculation means the suspension can advantageously be treated multiple times in a sequential manner. In other words this means that the suspension can be exposed repeatedly to the particle-processing portion.

It is conceivable that after a predefined time, the frequency of the ultrasonic sound waves can be changed such that the energy input on the particles will be different. It is also conceivable that the flow velocity can be altered after a predefined time. This allows for a different treatment and/or the treatment of another subpopulation.

The recirculation means might comprise a channel system and at least one corresponding adjusting means which can be a valve. The valve can particularly be an automated valve. The recirculation means can comprise at least one branched pipe and can also comprise a second pump. The channel system can comprise one channel or a plurality of channels that can be connected via at least one connection device.

One embodiment of the invention is characterized in that the device comprises a plurality of ultrasonic sound sources that are either arranged in series along the channel enabling a consecutive treatment of the suspension by the individual ultrasonic sound sources or wherein the device comprises a plurality of channels, wherein the plurality of ultrasonic sound sources is distributed across the plurality of channels and arranged such that the suspension in the plurality of channels can be treated by the plurality of ultrasonic sound sources enabling a parallel treatment of the suspension by the individual ultrasonic sound sources.

In that embodiment, the channel particularly comprises a plurality of particle-processing portions.

With the term "parallel treatment" it is meant that a treatment of the suspension in a plurality of particle-processing portions in particular at the same time is enabled.

Individual ultrasonic sound sources of the plurality of ultrasonic sound sources can emit sound waves with different frequencies. Alternatively, the individual ultrasonic sound sources of the plurality of ultrasonic sound sources can emit sound waves with identical frequencies. It is conceivable that the individual ultrasonic sound sources can be controlled individually. Of course, also a combined control of the individual ultrasonic sound sources is conceivable.

Individual channels of the plurality of channels or/and individual sections of the channel can be identically configured. Particularly, this includes that the individual channels or/and sections correspond to each other regarding the shape and the diameter. In an alternative embodiment, it is conceivable that the device comprises channels or sections differing in their configurations, e.g. by differing in their diameters.

It is conceivable that the conditions related to each of the particle-processing portions of the plurality of the particle-processing portions are the same. Conditions related to a particle-processing portion comprise for instance the flow velocity of the suspension and the frequency of the ultrasonic sound waves. With a device configured for a parallel treatment of the suspension a larger amount of the suspension can be treated under uniform conditions at the same time than with a device comprising a single particle-processing portion.

In an alternative embodiment, the conditions related to the individual particle-processing portions of the plurality of the particle-processing portions differ. In particular, if the device is configured for a serial treatment of the suspension, the suspension can be exposed to different conditions. This can include that the conditions of an upstream particle-processing portion are set such that large particles are treated and conditions of a subsequent downstream particle-processing portion are set such that small particles can be treated. In other word, such an embodiment can be used for a gradual treatment of the suspension. This can include a treatment that realizes a passage from a suspension to a dispersion.

The embodiment according to the invention comprises that the suspension can be exposed to different frequencies or intensities such that an optimal treatment of the suspension with respect to the specific objective of the procedure is achieved.

In an embodiment, the invention comprises a combination of a serial and a parallel arrangement of ultrasonic sound sources.

In another embodiment, the device comprises at least one dynamiciser. By means of a dynamiciser a switch between a serial and a parallel connection of channels and in particular of particle-processing portions can be realized. This way, the device is easily adjustable to specific requirements.

Different subpopulations of the particles can be treated in the different particle-processing portions enabling an efficient treatment of the suspension during a single run through the device. This can advantageously reduce the time required to achieve the respective objective of the treatment, e.g. to produce particles of a certain size.

According to another embodiment of the invention, the plasma source is configured to generate a pulsed plasma, or wherein the plasma source is a capacitive plasma source, or wherein the plasma source is a micro-wave plasma source.

These plasma sources are particularly effective in a combined ultrasonic sound and plasma treatment for disintegrating particles of a suspension.

In an embodiment, the plasma source is configured to generate pulsed plasma. In particular, the duration of the electrical pulses can be in the range of ns to μs. The duration of the pulses co-determine the so-called duty cycle which is the ratio between the pulse duration, i.e. the active plasma regime, and the period of the total signal. The duty cycle impacts the plasma chemistry, e.g. via controlling the fragmentation of the molecular components of the working gas. Hence, by means of pulsed plasma, the regulation of the duty cycle can regulate the plasma chemistry. If specific plasma chemistry is required for the treatment of the suspension, a plasma source configured to generate a pulsed plasma can be an advantage.

Moreover, the duration and the intensity of the plasma pulses can easily be regulated, e.g. via a control entity. In an embodiment the amplitudes of the plasma pulses can be regulated such that they are harmonized with the amplitudes of the ultrasonic sound waves.

In another embodiment, the plasma source is configured to generate capacitive-induced plasma. In this embodiment, an alternating field is applied to two electrodes, which are separated from each other by at least one dielectric and are controlled in the kHz frequency range with several kilovolts.

An alternative embodiment comprises a plasma source that is configured to generate microwave-induced plasma. Microwave-induced plasma can have a high chemical reactivity originating from the high electron density procurable, which itself has an influence on the density of further generated particles like ions, radicals, excited atoms and molecules. If plasma with high chemical reactivity is required for the treatment of the suspension, a plasma source configured to generate microwave-induced plasma can be an advantage.

According to the invention the device can comprise a plurality of plasma sources. An embodiment particularly comprises that in the case of a plurality of ultrasonic sound sources, the plurality of plasma sources is arranged such that each plasma source is associated with each one ultrasonic sound source.

In an embodiment, all individual plasma sources are configured to generate the same type of plasma. In another embodiment, the individual plasma sources can differ in the type of plasma such that particles treated in the particle-processing portions run by different ultrasonic sound sources can be exposed to different kinds of plasma, in particular to any combination of microwave-induced plasma, capacitive-induced plasma and pulsed plasma.

Of course, the invention also includes an arrangement in that not every individual ultrasonic sound source is associated with its own and specific plasma source.

Furthermore, according to an embodiment of the invention, the plasma source is arranged upstream of the ultrasonic sound source.

That the plasma source is arranged upstream of the ultrasonic sound source means that the plasma source is arranged closer to the entrance of the channel than the ultrasonic sound source.

In an embodiment, the plasma source is particularly arranged such that the plasma generated by the plasma source extends in the particle-processing portion such that the suspension can advantageously be treated simultaneously by ultrasonic sound waves and plasma, generating the occurrence of synergetic effects. Synergetic effects mean that the effect of the simultaneous treatment is stronger than the combined individual effects of treatment with ultrasonic sound waves and of treatment by plasma. Hence, a highly efficient treatment of the suspension can be enabled using this embodiment.

As the ultrasonic sound treatment of the suspension can leads to the formation of cavitation bubbles in the suspension, these bubbles can be simultaneously exposed to the plasma. This implies that the plasma can propagate in a cavitation bubble.

In an alternative embodiment, the plasma source is particularly arranged such that the plasma is generated in a portion that lies upstream of the particle-processing portion such that the suspension can be treated in a successive manner wherein the suspension is first exposed to plasma and afterwards exposed to ultrasonic sound. This way, the suspension is first treated chemically with plasma and afterwards treated mechanically by ultrasonic sound. It is conceivable that mechanical disintegration of particles is augmented if the suspension has been chemically treated before.

According to another embodiment of the invention, the instrumentation and control system can comprise at least one control unit configured to determine the efficiency of the treatment and/or to detect and/or regulate at least one parameter of the process. Such a parameter can be for example the pressure of the suspension, temperature, pH, and/or the flow velocity of the suspension, in particular in the particle-processing portion. The device can comprise a flow generator and flow controller and at least one sensor regarding the suspension flow. Additionally, the device can comprise a frequency converter and a rotational speed controller to adjust the flow velocity.

The instrumentation and control system can also be configured to adjust the operation mode, such as whether to recirculate the suspension via the recirculation means. It can also switch between a parallel processing mode and a serial processing mode.

The device can be configured to receive data from the instrumentation and control system, to store the data and/or to process the data. Raw data and/or processed data could be visualized. In addition, an output and/or a transmission of raw data and/or processed can be provided.

In particular, it is intended that the device comprises an automation unit that can be capable of adjusting the instrumentation and control system in accordance with the received data and the objective of the treatment.

Another aspect of the invention is related to a method for disintegrating particles of a suspension with a device according to the invention. The method comprises the steps of:
  flowing the suspension along a flow direction with a flow velocity,
  exposing the suspension to an ultrasonic field that is configured to disintegrate the particles, wherein the ultrasonic field extends in a particle-processing portion for disintegrating the particles of the suspension,
  exposing the suspension in the particle-processing portion of the channel to an inertial force that is gravity or a centrifugal force, and
  disintegrating the particles of the suspension in the particle-processing portion.

Therein, the flow velocity of the suspension is adjusted such that the duration of a retention time of the particles in the particle-processing portion is prolonged such that the energy input on said particles is increased, wherein the sizes and/or densities of these processed particles are within predefined intervals.

The method according to the invention provides the controlled treatment of a suspension.

The flow velocity can be adjusted by means of the at least one pump of the device.

Particularly, the ultrasonic field is generated by the ultrasonic sound source.

That the retention time of a particle in the particle-processing portion is prolonged means that this particle gets a prolonged treatment.

According to one embodiment of the method the flow of the suspension is pulsed or interleaved, particularly varying between a flow velocity of zero and a predefined flow velocity, or wherein the flow velocity is repeatedly reversed from a forward direction to a backward direction for predefined time intervals such that a net flow direction of the suspension remains in the forward direction.

The flow of the suspension in forward or backward direction means that the flow direction is oriented towards the channel exit or entrance, respectively.

In particular, it is intended that the at least one pump is configured and arranged such that it can achieve a pulsed or interleaved flow of the suspension. In an embodiment the pump is configured and arranged such that the orientation of the flow of the suspension can be changed repeatedly. In other words this means that the flow direction can be repeatedly reversed from a forward direction to a backward direction and vice versa.

This embodiment advantageously allows for the repeated treatment of particles because particles can be fed to the particle-processing portion again by reversing the flow direction. A particle can also be treated for a prolonged time because the flow of a particle through the particle-processing portion can be decelerated by the pulsed, interleaved and/or temporally reversed flow.

In an alternative embodiment, the device comprises a plurality of pumps that are configured and arranged such that they can generate a pulsed, interleaved and/or temporally reversed flow of the suspension.

According to another embodiment of the invention, the suspension is consecutively exposed several times to the particle-processing portion of either a plurality of ultrasonic sound sources or the same ultrasonic sound source.

The suspension can be consecutively exposed several times to the particle-processing portion of the same ultrasonic sound source due to an interleaved or temporally reversed flow of the suspension. Alternatively, the device can comprise a recirculation means that is configured to circulate the suspension that is flowing past the particle-processing portion back to the entrance of the channel such that the suspension can be exposed to the particle-processing portion again.

In another embodiment, the device comprises a plurality of ultrasonic sound sources generating a plurality of particle-processing portions that are arranged in series such that the suspension can be treated consecutively. The at least one pump can be configured and arranged to generate a continuous suspension flow in forward direction.

It is also conceivable that the at least one pump can be configured and arranged to generate a pulsed, interleaved and/or temporally reversed flow of the suspension.

According to another embodiment of the invention the suspension is shaken such that particles of the suspension, in particular settled particles of the suspension, are moved into a predefined section of the device.

The shaking can be facilitated by a shaking device on which the device according to the invention is put.

According to the invention a predefined section can be a settling portion and/or a sluiceway.

It is intended that by means of shaking, particles of the suspension, particularly settled particles, are set into motion such that these particles can easily be removed from the device via a sluiceway or by moving the settled particles to the settling portion.

According to another embodiment of the invention, the suspension is treated with a plasma, wherein the plasma is a microwave-induced plasma, a capacitive-induced plasma, and/or a pulsed plasma.

This embodiment allows for mechanical and chemical treatment of the suspension by ultrasonic sound and plasma, respectively.

In particular the ultrasonic sound source and the plasma source are arranged such that the plasma extends in the particle-processing portion or such that the plasma extends upstream of the particle-processing portion such that the suspension can be treated simultaneously or consecutively, respectively.

The method according to the invention is not restricted to disintegrate particles in a suspension, but can also be used to treat fluids in a specific and selective way.

As the method and the device according to the invention allow the generation of a predefined, particularly narrow, particle size distribution it is possible to destroy specific noxious substances or microbes or to free the suspension of specific ingredients.

Moreover, it is possible to comminute compounds down to molecular sizes and thus to alter and design the properties of the fluids, such as for disinfection and noxious substance elimination.

The invention could be used in an agricultural context, for instance for the processing of digestates, slurry or other suspensions. It is also conceivable to use the invention for wastewater treatment.

In particular, the simultaneous or sequential effect mediated by ultrasonic sound and plasma can lead to the disintegration of particles that are difficult to break apart, as e.g. lignin.

Exemplary embodiments of the invention are shown in the figures.

In FIG. 1, a device 1 according to the invention is shown. The device 1 comprises a channel 10 that extends along a central axis 50 which is shown as a dashed line. The channel 10 can comprise an entrance 18 at the bottom and an exit 19 at the top of the channel 10. Particularly, the cross-sectional area of the channel 10 can have a circular shape. The diameter of the channel 10 might be greater at the exit 19 than at the entrance 18. The channel 10 can comprise a straight section 14.

In another embodiment, the diameter of the channel 10 remains constant along the extension direction of the channel 10.

In the channel 10, a suspension can flow along the flow direction 100 from the entrance 18 to the exit 19. The entrance 18 is located upstream of the exit 19.

The suspension comprises particles 3. Individual particles 3 may differ in at least one property such as e.g. material composition, size, shape and density. Particles 3 with properties in predefined intervals can be pooled in a subpopulation of particles 3. The suspension can comprise a plurality of different subpopulations.

The device 1 can comprise an ultrasonic sound source 30 that can comprise an end face 32. The end face 32 can be arranged inside the channel 10 and can be arranged such that the extension plane of the end face 32 is oriented perpendicularly to the flow direction 100.

The ultrasonic field generated by the ultrasonic sound source 30 extends at least in the particle-processing portion 12 inside the channel 10, in particular in the straight section 14. The ultrasonic sound source 30 can be configured and arranged such that ultrasonic sound emitted by the ultrasonic sound source 30 propagates with at least one vector component against the flow direction 100 of the suspension within the particle-processing portion 12.

Ultrasonic sound waves can generate cavitation. If cavitation bubbles collapse, they can cause high pressure that can act as a disruptive force on particles 3 leading to the disintegration of these particles 3. Ultrasonic sound waves can also disrupt molecular bonds of particles 3 or can lead to the generation of radicals that can interact with the particles 3.

The frequency of the emitted ultrasonic sound wave can be regulated via a control module 34.

Moreover, the device 1 can comprise a plasma source 80. The device 1 shown in FIG. 1 comprises a plasma source to generate pulsed plasma 82. The plasma can overlap with the particle-processing portion 12. In this case, the particles 3 can simultaneously be treated by the plasma and by ultrasonic sound waves originating from the ultrasonic sound source 30. In particular, radicals can be generated by the plasma source 80 which can cause chemical erosion of the particles 3. Hence, chemical comminution and mechanical comminution by ultrasonic sound work together, increasing the efficiency of the device 1 in disintegrating particles 3.

The plasma source 80 can comprise a control entity 88 that is configured to regulate the generation of the plasma. According to the invention the plasma source 80 can be configured such that the plasma generation is independent of the generation of ultrasonic sound waves. In an alternative embodiment the device 1 is configured to commonly regulate both the plasma and the ultrasonic sound.

In case a plasma source is used to generate pulsed plasma 82, a control entity 88 can be configured to adjust the power and the specification regarding the duty cycle.

The device 1 can comprise a pump 20 that can be configured to pump the suspension in the channel 10 along the flow direction 100. The flow direction 100 can be directed against the inertial force 40 which is gravity 42. The pump 20 can be arranged and configured to adjust flow velocity of the suspension. This can be realized by means of a control unit 24.

The suspension can be flowing from the entrance 18 to the exit 19 at a predefined flow velocity. As the gravity 42 of the earth is oriented against the flow direction 100, particles 3 with predefined properties such as e.g. size and/or density will essentially float at the same section in the channel 10 as the drag of the suspension and the gravity 42 compensate each other. In other words this means that by means of the interplay between flow velocity and gravity 42, the particles 3 can be sorted in predefined spatial particle distributions. This can include that the subpopulations of particles 3 will spatially be separated from each other.

The flow velocity can be adjusted such that a predefined subpopulation of particles 3 can remain for a longer time in the particle-processing portion 12 such that the particles 3 can be treated for a prolonged time by ultrasonic sound or ultrasonic sound and plasma. If these particles 3 are comminuted, at least one of their properties, e.g. the size, can be altered such that drag and gravity 42 do not compensate each other anymore. The processed particles 3 can be carried away with the flow, leaving the particle-processing portion 12. They can leave the channel 10 via the exit 19.

By changing the flow velocity, another subpopulation of particles 3, e.g. a subpopulation including particles 3 of another size, can easily be treated. Hence, by means of the device 1 a suspension comprising particles 3 with unequal properties, e.g. different sizes and/or densities, can be disintegrated in a controlled manner.

Figure 2:
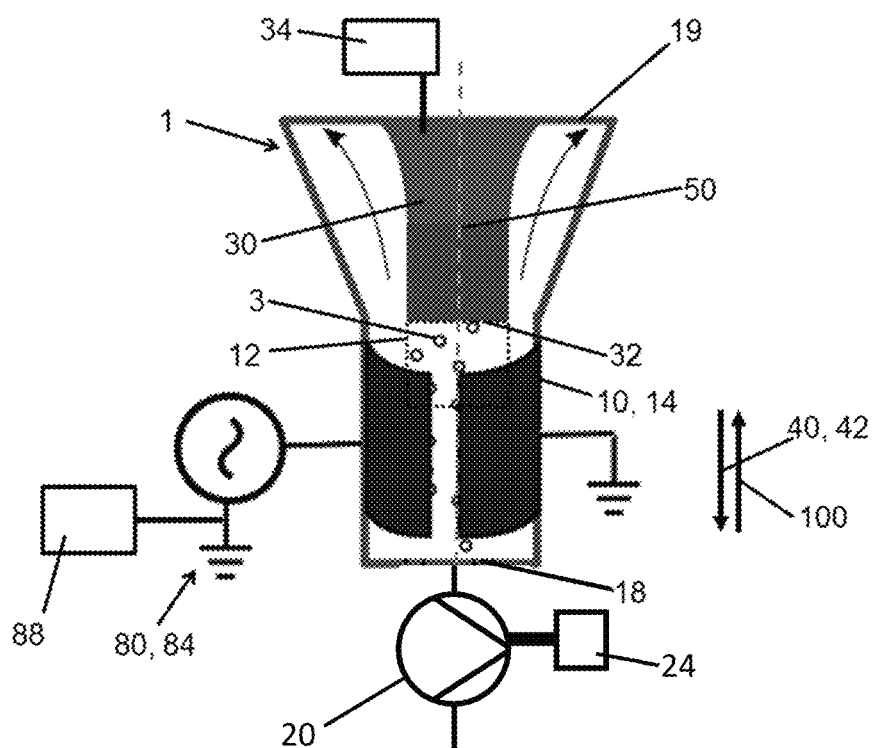
FIG. 2 a schematic cross-section of a device comprising a straight section and a capacitive-induced plasma.

In FIG. 2, a device 1 similar to the device 1 presented in FIG. 1 is shown. Both devices 1 only differ in the plasma source 80 they comprise. While the device 1 in FIG. 1 comprises a plasma source to generate pulsed plasma 82, the device 1 shown in FIG. 2 comprises a plasma source comprising a dielectric and two electrodes to generate capacitive-induced plasma 84. All other components are identical in FIG. 1 and FIG. 2.

Figure 3:
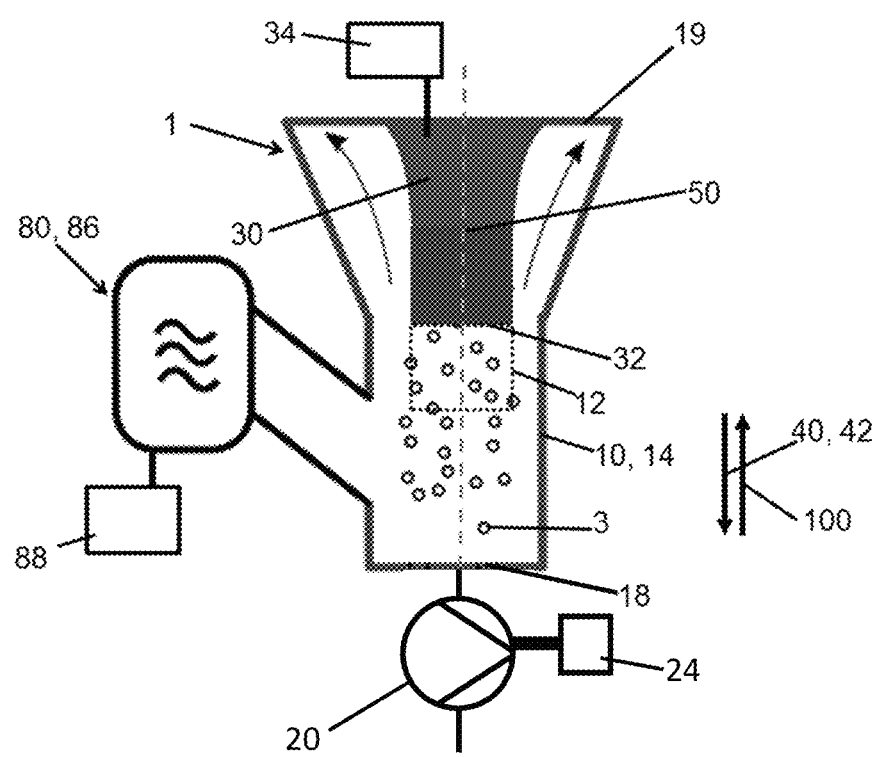
FIG. 3 a schematic cross-section of a device comprising a straight section and a micro-wave-induced plasma source.

The device 1 presented in FIG. 3 differs from the devices 1 shown in FIG. 1 and FIG. 2 in the plasma source 80 it comprises. Here, the plasma is generated by a microwave-induced plasma source 86. All other components shown in FIG. 3 are identical to the components shown in FIG. 1.

Figure 4:
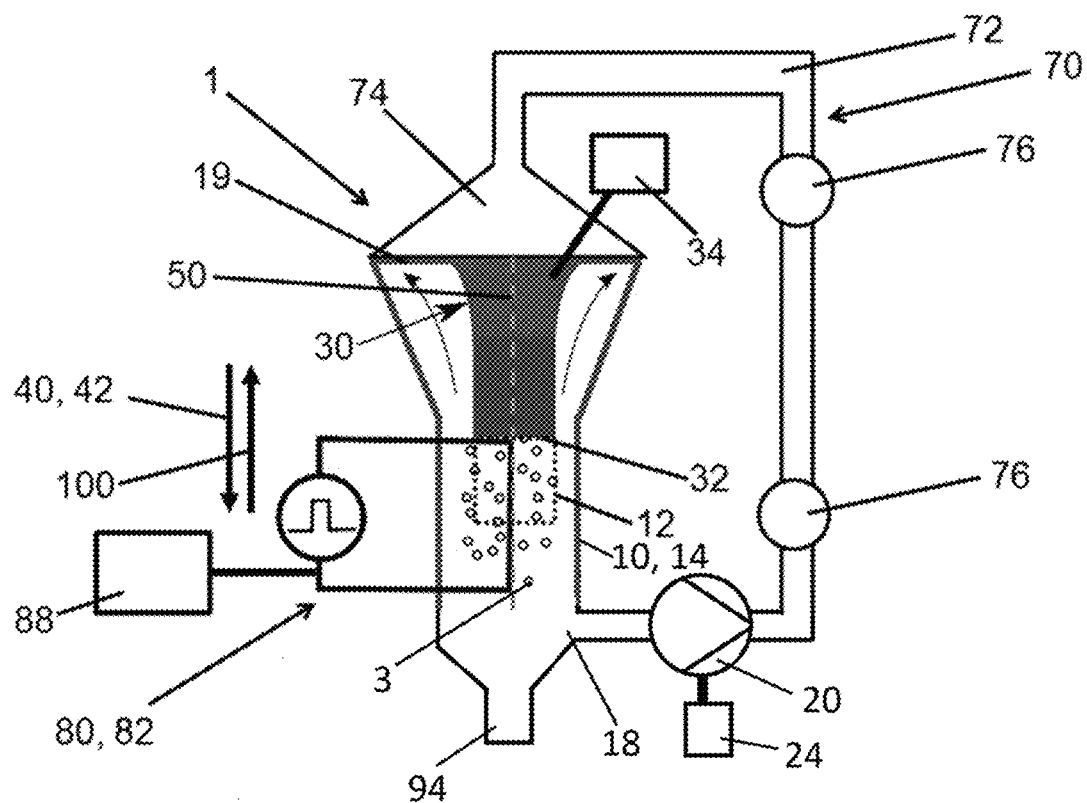
FIG. 4 schematic representation of a device comprising a pulsed plasma source and a recirculation means.

The device 1 shown in FIG. 4 is similar to the device 1 presented in FIG. 1 but additionally comprises a recirculation means 70 including a channel system 72. The recirculation means 70 can also comprise an adjusting means 76. An adjusting means 76 can be a valve, in particular an automated valve. In another embodiment, the recirculation means 70 can also comprise a second pump.

The suspension that leaves the channel 10 through the exit 19 can enter the channel system 72 of the recirculation means 70, e.g. via a collecting section 74. Via the channel system 72 and by means of adjusting means 76, the suspension can be guided back to the pump 20, can reenter the channel 10 and can be exposed to the particle-processing portion 12 again. Hence, the device 1 can provide a multiple, sequential treatment of the suspension.

In an embodiment, the flow velocity can be changed after specific time intervals such that the retention time of different subpopulations in the particle-processing portion 12 can be prolonged. It is also conceivable that the frequency of the ultrasonic sound can be altered and/or that characteristics of the plasma can be changed, such that the mechanical and/or chemical treatment of the suspension can be altered.

In another embodiment, the suspension can be directly guided from the exit 19 to the entrance 18.

In an alternative embodiment, the device 1 can comprise a plasma source to generate capacitive-induced plasma or a plasma source to generate microwave-induced plasma.

According to the invention, the device 1 can comprise a settling portion 94. In an embodiment, the settling portion 94 can be a container. The settling portion 94 can be arranged and configured such that a particle 3 with specific predefined properties can deposit in the settling portion 94. This can be a particle 3 that does not flow within the suspension anymore.

Figure 5:
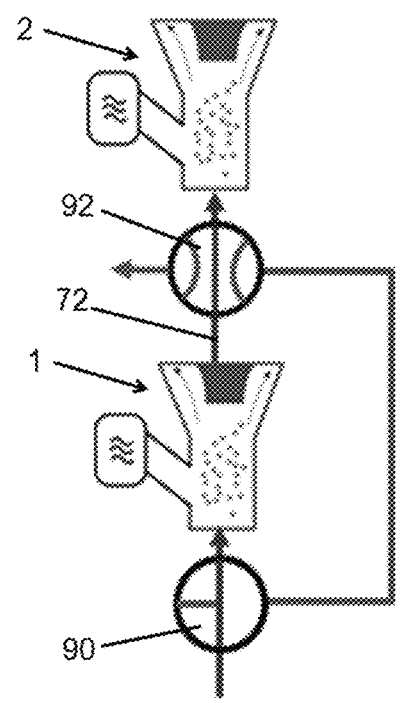
FIG. 5 schematic representation of a series connection of two devices as shown in FIG. 1.

In an embodiment the settling portion 94 is configured such that it is easily accessible from outside such that the settled particles are easily accessible. It is conceivable that the settling portion 94 is configured such that it is reversibly removable from the device FIG. 5 schematically illustrates a series connection of a first device 1 and a second device 2 wherein both devices 1, 2 comprise a plasma source to generate microwave-induced plasma as presented in FIG. 3. By means of a pump, the suspension flows through the first device 1. After the suspension has left the first device 1, it can be supplied to the second device 2 in which the suspension is treated again. Hence, the suspension can consecutively be treated by two different devices 1, 2. In an embodiment, the devices 1, 2 are configured such that the flow velocities in the two devices 1, 2 differ such that different subpopulations of particles 3 can be treated by means of the two devices 1, 2.

To direct the suspension from the first device 1 to the second device 2 a channel system 72 and/or an adjusting means can be used.

In an alternative embodiment, the first device 1 and/or the second device 2 can comprise a plasma source to generate capacitive-induced plasma or a plasma source to generate pulsed plasma.

The invention is not limited to two devices 1, 2 that are connected serially. According to the invention, a plurality of devices 1 can be connected serially.

Figure 6:
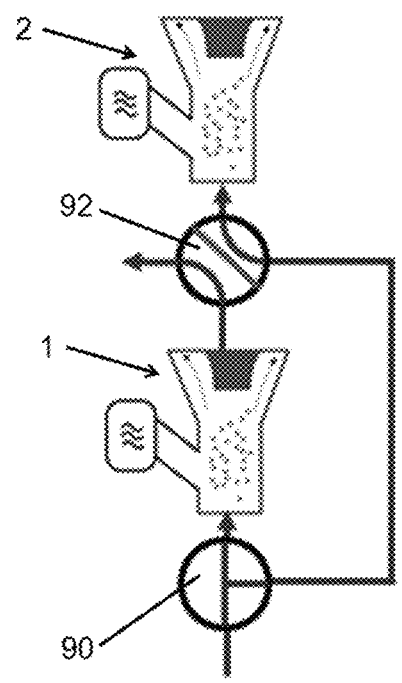
FIG. 6 schematic representation of a parallel connection of two devices as shown in FIG. 1.

FIG. 6 schematically illustrates a parallel connection of a first device 1 and a second device 2 wherein both devices 1, 2 comprise a plasma source to generate microwave-induced plasma as presented in FIG. 3. In that embodiment, the suspension can be distributed between both devices 1, 2. In an embodiment, the devices 1, 2 can be configured such that the flow velocity in the first device 1 differs from the flow velocity in the second device 2 such that different subpopulations of particles 3 can be treated by means of the two devices 1, 2. It is also conceivable that the flow velocities are equal in both devices 1, 2.

In an alternative embodiment, the first device 1 and/or the second device 2 can comprise a plasma source to generate capacitive-induced plasma. Another embodiment is characterized in that the plasma source of the first device 1 and/or the plasma source of the second device 2 can be a plasma source to generate pulsed plasma.

The invention is not limited to two devices 1, 2. The invention alternatively comprises that a plurality of devices 1 can be connected in parallel.

In one embodiment of the invention, the device comprises a first dynamiciser 90 and a second dynamiciser 92. By means of a dynamiciser 90, 92 a serial connection can be switched to a parallel connection of the devices 1, 2 and vice versa such that depending on the specific requirements, the more suitable connection can easily be used without major modifications of the devices 1, 2. This advantageously reduces the time and effort required.

In another embodiment, the invention can comprise a plurality of dynamicisers 90 that are configured and arranged for switching from a serial connection to a parallel connection of a plurality of devices 1 and vice versa.

An embodiment according to the invention comprises a combination of a serial connection of a plurality of devices 1 and a parallel connection of a plurality of devices 1. Each individual dynamiciser 90 of the plurality of dynamicisers 90 can be regulated individually.

Figure 7A:
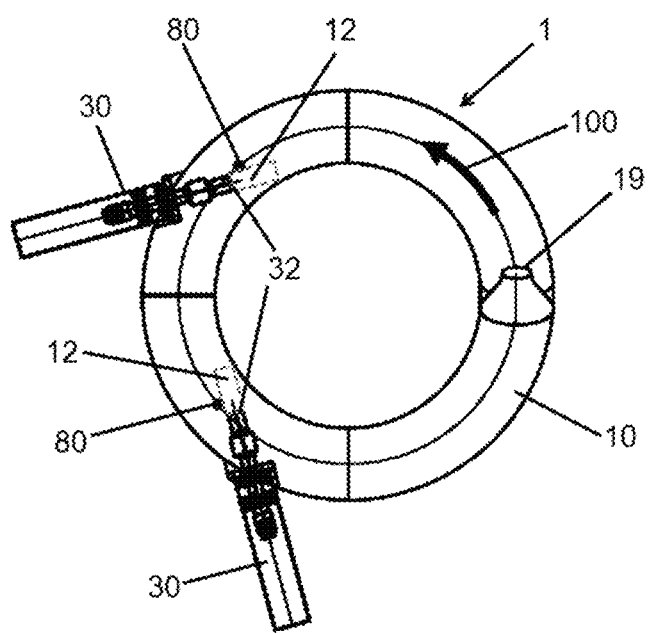
FIGS. 7A-7C various views of a device comprising a curved channel.
Figure 7B:
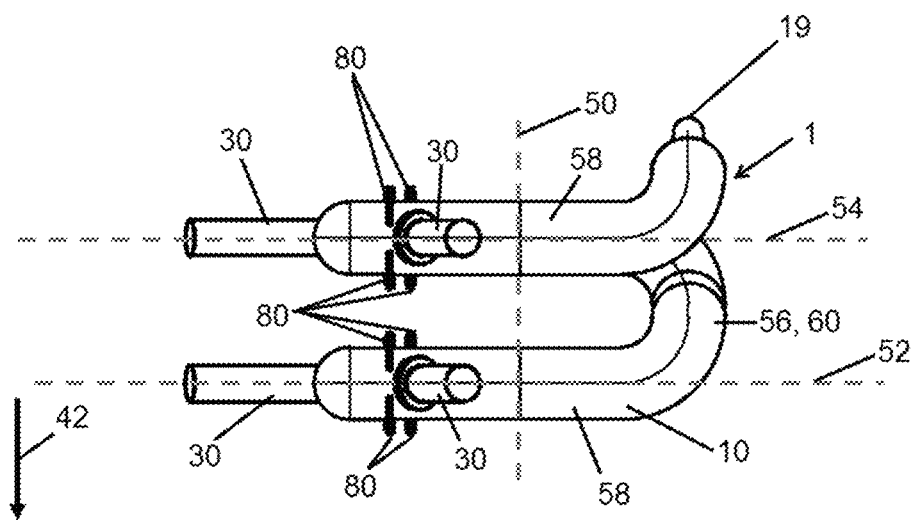
Figure 7C:
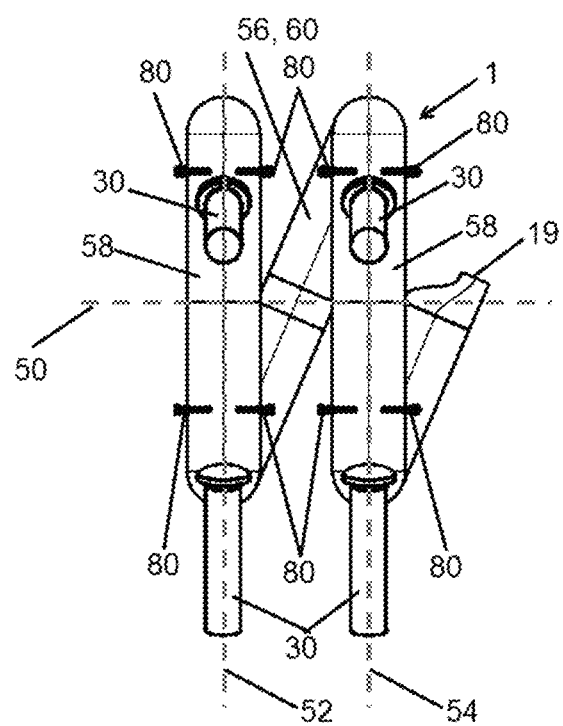

In FIG. 7 a device 1 according to the invention is shown that comprises a curved channel 10 and a plurality of ultrasonic sound sources 30 that are arranged in series. This allows for a sequential treatment of the suspension by the ultrasonic sound sources 30 when the suspension flows along the channel 10. FIG. 7A shows a top view of the device 1, FIG. 7B and FIG. 7C each show a side view of the device 1.

The channel 10 extends in a curved manner around the central axis 50 that extends along the direction of gravity 42. The cross-sectional area of the channel 10 can have a circular shape wherein the diameter of the channel 10 can be constant along the extension direction of the channel 10. The channel 10 can comprise an entrance at the bottom of the channel 10 and an exit 19 at the top of the channel 10. The suspension can be flowing from the entrance to the exit 19.

In an embodiment, the channel 10 essentially comprises two sections, a first section 58 that extends circularly in a plane and a second section 60 that is connected to the first section 58 and interlinks two first sections 58 that are arranged on two parallel planes.

The channel 10 can comprise two first sections 58 of which one can extend circularly in a first plane 52 and one can extend circularly in a second plane 54 wherein the first and the second plane 52, 54 extend perpendicularly to the central axis 50. The radii of both circular first sections 58 can be equal. The two circular first sections 58 can be interlinked via an intermediate second section 56 in that the channel 10 extends with an angle greater than 0° and smaller than 90° related to the central axis 50. In the intermediate section 56 the channel 10 can extend helically around the central axis 50.

In another embodiment, the device 1 can extend in a plurality of first sections 58 extending in a plurality of planes 52, 54 and can comprise a plurality of second sections 60 to interlink two first sections 58. In an embodiment, the radii of the circular first sections 58 are not equal. In this case, the intermediate section 56 can extend in a spirally manner around the central axis 50. In another embodiment, the channel 10 can extend helically around the central axis 50 such that the slope of the channel 10 related to the central axis 50 is equal at each point of the channel 10. An embodiment comprises a channel 10 that extends spirally around the central axis 50, implying that the slope of the channel 10 related to the central axis 50 remains equal along the extension direction of the channel 10, but the distance between the channel 10 and the central axis 50 changes along the extension direction of the channel 10.

The device 1 shown in FIG. 7 comprises four ultrasonic sound sources 30 that are arranged along the channel 10. Each two ultrasonic sound sources 30 are arranged on either the first or the second plane 52, 54.

Each ultrasonic sound source 30 is arranged such that at least the respective end face 32 is located inside the channel 10 and oriented such that the ultrasonic field generated by each ultrasonic sound source 30 extends in a particle-processing portion 12 inside the channel 10 and propagates with at least one vector component against at least one vector component of the flow direction 100 of the suspension within the particle-processing portion 12.

The invention is not restricted to the aforementioned number and/or arrangement of the ultrasonic sound sources 30 along the channel 10. The device 1 can comprise one ultrasonic sound source 30. In particular it is intended that the device 1 comprises a plurality of ultrasonic sound sources 30.

In addition, the device 1 can comprise at least one plasma source 80. A plasma source 80 can be a plasma source to generate pulsed plasma, a plasma source to generate capacitive-induced plasma, or a plasma source to generate microwave-induced plasma.

FIG. 7 shows a device 1 that comprises four plasma sources 80. Each plasma source 80 supplies one ultrasonic sound source 30 and is positioned such that the plasma generated by the respective plasma source 80 extends in the particle-processing portion 12 of the related ultrasonic sound source 30.

In an alternative embodiment, a plasma source 80 is arranged such that the plasma is generated in a portion that lies upstream of the particle processing portion 12. In an embodiment, the position of a first plasma source 80 in relation to its respective ultrasonic sound source 30 can differ from the position of a second plasma source 80 in relation to its respective ultrasonic sound source 30.

According to the invention the device can comprise at least one dynamiciser that is configured to switch between a serial and a parallel connection of devices 1.

Figure 8:
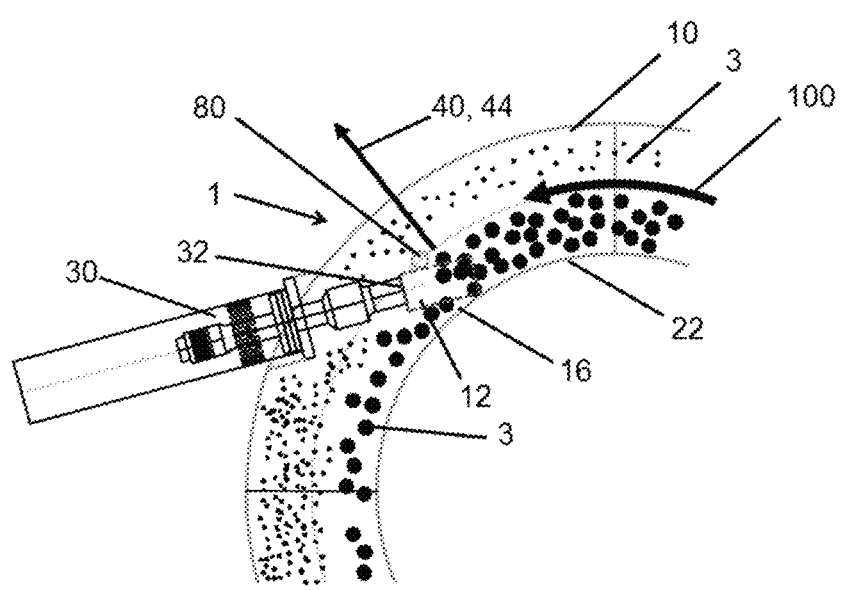
FIG. 8 enlarged schematic cross-section of the top view of the device shown in FIGS. 7A-7C.

In FIG. 8, an enlarged schematic cross-section of the top view of the device 1 given in FIG. 7 is shown. It illustrates the working principle of an embodiment according to the invention in that the inertial force 40 is a centrifugal force 44.

The enlarged top view shows a section of a curved channel 10 in that an ultrasonic sound source 30 is located generating a particle-processing portion 12 in the curved section 16. The ultrasonic sound source 30 can be configured and be arranged such that the particle-processing portion 12 extends only in a part of the channel which in particular means that the particle-processing portion 12 extends only in a part of the cross-sectional area of the channel 10. In particular, the part in that the particle-processing portion 12 extends is close to the inner edge 22 of the channel 10.

A plasma source 80 is arranged such that the plasma generated by the plasma source 80 extends at least partially in the particle-processing portion 12.

A suspension can flow along the flow direction 100 in the curved channel 10. Because the suspension flows along a curved section 16, a centrifugal force 44 can act on the suspension. The suspension comprises particles 3 that can be divided into two subpopulations, indicated by the great and small dots in FIG. 8. The respective particles 3 can differ e.g. in size, shape, or density. The larger a particle 3, the closer it will be located to the inner edge 22 as the sedimentation velocity in the direction of the centrifugal force 44 is inversely proportional to the size of the particle 3 such that the particles 3 of the suspension can be separated by means of their size. Hence, the particles 3 can be sorted in pre-defined spatial particle distributions.

Since in particular large particles 3 are located close to the inner edge 22 of the channel 10, preferentially those particles 3 can be treated in the particle-processing portion 12. Smaller particles 3 can flow past the particle-processing portion 12 without being exposed to ultrasonic sound waves in the particle-processing portion 12.

LIST OF REFERENCE NUMERALS 1 device
2 second device
3 particle
10 channel
12 particle processing portion
14 straight section
16 curved section
18 entrance
19 exit
20 pump
22 inner edge
24 control unit
30 ultrasonic sound source
32 end face
34 control module
40 inertial force
42 gravity
44 centrifugal force
50 central axis
52 first plane
54 second plane
56 intermediate section
58 first section
60 second section
70 recirculation means
72 channel system
74 collecting section
76 adjusting means
80 plasma source
82 plasma source to generate pulsed plasma
84 plasma source to generate capacitive-induced plasma
86 plasma source to generate microwave-induced plasma
88 control entity
90 first dynamiciser
92 second dynamiciser
94 settling portion
100 flow direction

We claim:

1. A device (1) for disintegrating particles (3) of a suspension with ultrasonic sound, the device (1) comprising:
a channel (10) for a suspension, wherein the channel (10) comprises a particle-processing portion (12),
at least one pump (20) configured and arranged to adjust a flow velocity of the suspension in the channel (10),
at least one ultrasonic sound source (30), arranged at the channel (10) such that an ultrasonic field generated by the ultrasonic sound source (30) extends at least in the particle-processing portion (12) inside the channel (10),
wherein the device (1) comprises an instrumentation and control system with at least one control unit configured to regulate the flow velocity of the suspension and at least one of the following: a pressure, a temperature and/or a pH-value of the suspension, such that particles (3) of the suspension are arrangeable in a predefined spatial particle distribution in the particle-processing portion (12) of the channel (10) by adjusting the flow velocity of the suspension with respect to an inertial force (40) acting on the suspension, wherein the inertial force (40) is gravity (42) or a centrifugal force (44), wherein the device (1) comprises a plasma source (80), wherein the plasma source (80) is arranged such that a plasma generated by the plasma source (80) extends into the particle-processing portion (12) or upstream of the particle-processing portion (12), wherein the device (1) comprises a recirculation means (70) comprising a channel system (72) that is configured to circulate the suspension flow past the particle-processing portion (12) back to an entrance (18) of the channel (10), such that the suspension can be exposed to the particle-processing portion (12) again.

2. Device (1) according to claim 1, wherein if the device (1) is configured to process the particles (3) by means of gravity (42) as the inertial force (40), the channel (10) comprises a straight section (14) that comprises the particle-processing portion (12), wherein the channel (10) is oriented such that the flow velocity of the suspension is oriented against gravity (42).

3. Device (1) according to claim 1, wherein if the device (1) is configured to process the particles (3) by means of a centrifugal force (44) as the inertial force (40), the channel (10) comprises a curved section (16) that is curved around a central axis (50) along the direction of gravity (42) and comprises the particle-processing portion (12).

4. Device (1) according to claim 1, wherein the ultrasonic sound source (30) is arranged in the channel (10) such that the channel (10) encloses the ultrasonic sound source (30), enabling the suspension to pass the ultrasonic sound source (30).

5. Device (1) according to claim 1, wherein the device (1) comprises a settling portion (94), where settled particles (3) of the suspension are received.

6. Device (1) according to claim 1, wherein the device (1) comprises a plurality of ultrasonic sound sources (30) that are either arranged in series along the channel (10) enabling a consecutive treatment of the suspension by the individual ultrasonic sound sources (30) or wherein the device (1)

comprises a plurality of channels (10), wherein the plurality of ultrasonic sound sources (30) is distributed across the plurality of channels (10) and arranged such that the suspension in the plurality of channels (10) can be treated by the plurality of ultrasonic sound sources (30) enabling a parallel treatment of the suspension by the individual ultrasonic sound sources (30).

7. Device (1) according to claim 1, wherein the plasma source (80) is configured to generate a pulsed plasma (82), or wherein the plasma source (80) is a capacitive plasma source (84), or wherein the plasma source (80) is a microwave plasma source (86).

8. Device (1) according to claim 1, wherein the plasma source (80) is arranged upstream of the ultrasonic sound source (30).

9. Device according to claim 1, wherein the plasma source is configured to generate a thermal plasma and/or an electric arc discharge, particularly wherein the plasma source comprises a plasma torch configured to generate the hot plasma or the electric arc discharge.

10. A method for disintegrating particles of a suspension with a device (1) according to claim 1, comprising the following steps:
   running the suspension along a flow direction (100) with a flow velocity,
   exposing the suspension to an ultrasonic field generated by an ultrasonic sound source (30) that is configured to disintegrate the particles (3), wherein the ultrasonic field extends in a particle-processing portion (12) for disintegrating the particles (3) of the suspension,
   exposing the suspension in the particle-processing portion (12) of the channel (10) to an inertial force (40) that is gravity (42) or a centrifugal force (44),
   disintegrating the particles (3) of the suspension in the particle-processing portion (12),
wherein the flow velocity of the suspension is adjusted with respect to the inertial force (40) acting on the suspension such that the duration of a retention time of the particles (3) in the particle-processing portion (12) is prolonged such that an energy input on said particles (3) is increased, wherein the sizes and/or densities of these processed particles (3) are within predefined intervals, wherein the suspension flow is circulated past the particle-processing portion (12) back to an entrance (18) of the channel (10) by means of recirculation means (70) comprising a channel system (72), such that the suspension can be exposed to the particle-processing portion (12) again.

11. Method according to claim 10, wherein the flow of the suspension is pulsed or interleaved, particularly varying between a flow velocity of zero and a predefined flow velocity, or wherein the flow velocity is repeatedly reversed from a forward direction to a backward direction for predefined time intervals such that a net flow direction (100) of the suspension remains in forward direction.

12. Method according to claim 10, wherein the suspension is consecutively exposed several times to the particle-processing portion (12) of either a plurality of ultrasonic sound sources (30) or the same ultrasonic sound source (30).

13. Method according to claim 10, wherein the suspension is shaken such that particles (3) of the suspension, in particular settled particles of the suspension, are moved into a predefined section of the device (1).

14. Method according to claim 10, wherein the suspension is treated with a plasma, wherein the plasma is particularly one of:
   a microwave-induced plasma,
   a capacitively-induced plasma, and/or
   a pulsed plasma.

* * * * *